United States Patent
Chai et al.

(10) Patent No.: US 11,002,401 B2
(45) Date of Patent: May 11, 2021

(54) CHASSIS HAVING ANTI-SLIP PAD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chung Chai, New Taipei (TW); Da-Long Sun, Wuhan (CN); Yu-Ming Xiao, Wuhan (CN); Lin Ding, Wuhan (CN); Hai-Yang Xiong, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/662,209

(22) Filed: Oct. 24, 2019

(65) Prior Publication Data
US 2021/0062958 A1    Mar. 4, 2021

(30) Foreign Application Priority Data
Aug. 26, 2019  (CN) .......................... 201910792588.1

(51) Int. Cl.
*F16M 7/00*  (2006.01)
(52) U.S. Cl.
CPC ..................... *F16M 7/00* (2013.01)

(58) Field of Classification Search
CPC ........................................................ F16M 7/00
USPC .................................................. 248/135, 687
See application file for complete search history.

(56) References Cited

U.S. PATENT DOCUMENTS

| | | | | |
|---|---|---|---|---|
| 3,401,908 A * | 9/1968 | Rapata | ................... | A47B 91/12 248/188.8 |
| 5,169,115 A * | 12/1992 | Chung Hsiang | ....... | A47B 91/04 16/30 |
| 5,971,350 A * | 10/1999 | McCutcheon | ....... | A47B 91/028 248/688 |
| 9,144,309 B2 * | 9/2015 | Adams | ................... | A47B 91/04 |
| 2008/0029664 A1 * | 2/2008 | Hsu | ...................... | F16M 13/005 248/188.8 |
| 2013/0075550 A1 * | 3/2013 | Chiu | ...................... | G06F 1/181 248/188.9 |
| 2013/0234572 A1 * | 9/2013 | Hsu | ........................ | G06F 1/181 312/223.2 |

* cited by examiner

*Primary Examiner* — Muhammad Ijaz
(74) *Attorney, Agent, or Firm* — ScienBiziP, P.C.

(57) ABSTRACT

A chassis includes a housing and at least one anti-slip pad mounted on the housing. The housing includes a mounting slot. The anti-slip pad includes a support member and an insert member coupled to the support member. The support member is configured to support the housing. The insert member is configured to latch in the mounting slot. A hardness of the insert member is greater than a hardness of the support member.

6 Claims, 5 Drawing Sheets

CHASSIS HAVING ANTI-SLIP PAD

FIELD

The subject matter herein generally relates to a chassis, and more particularly to a chassis having an anti-slip pad.

BACKGROUND

Generally, an anti-slip mat for a chassis is either too soft to be fixed firmly, or too hard and has no shock absorption effect.

BRIEF DESCRIPTION OF THE DRAWINGS

Implementations of the present disclosure will now be described, by way of embodiments, with reference to the attached figures.

DETAILED DESCRIPTION

Figure 1:
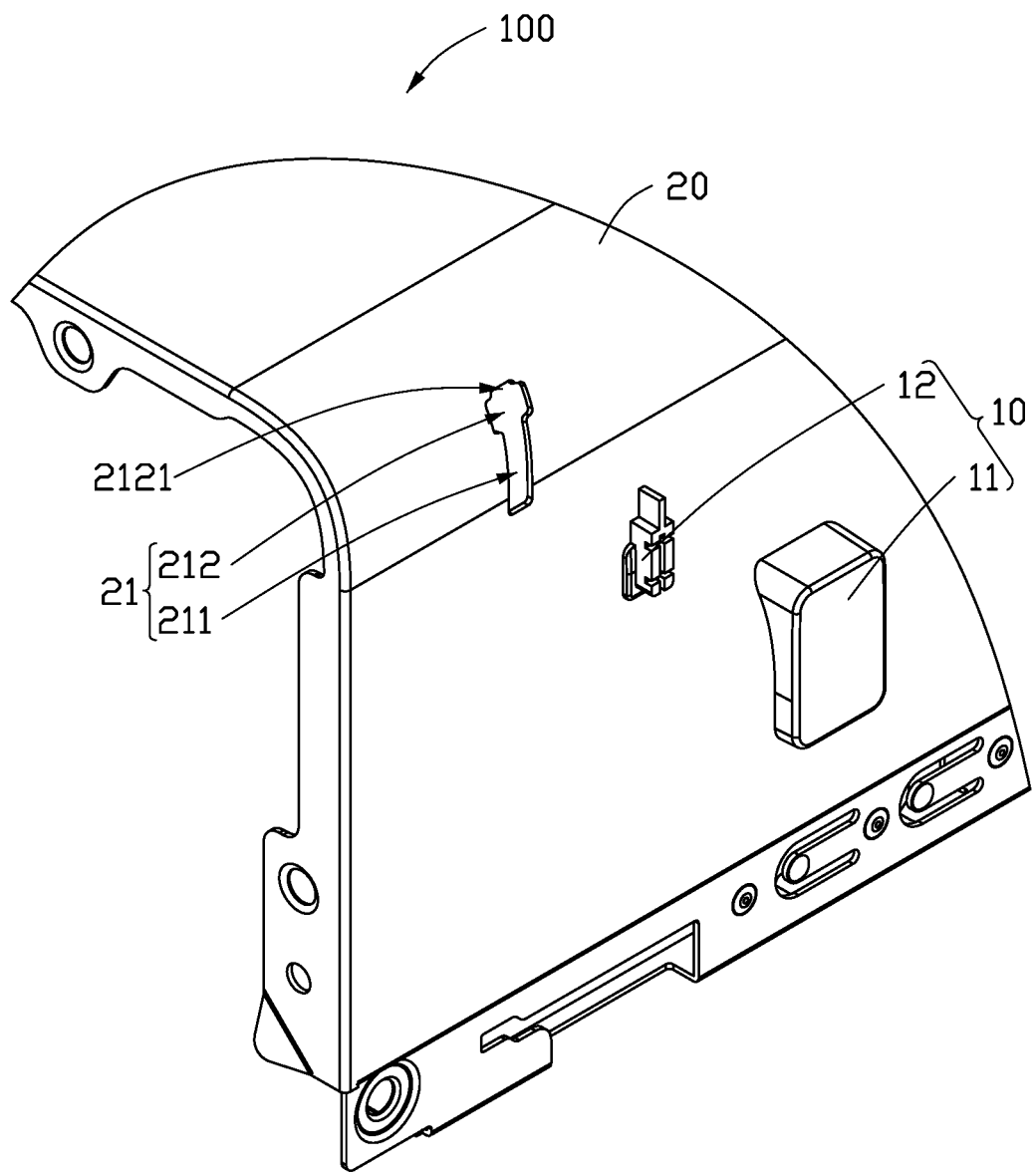
FIG. 1 is a partial exploded view of an embodiment of a chassis.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 2:
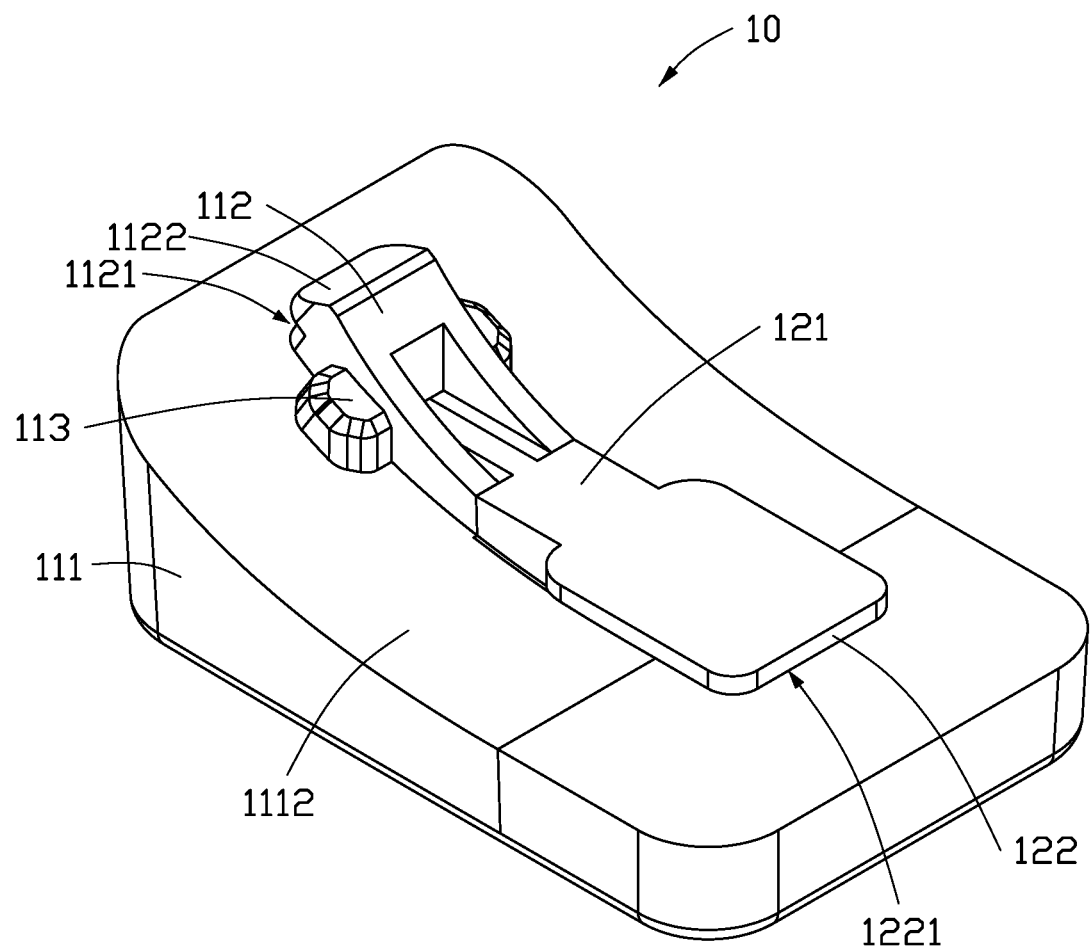
FIG. 2 is an isometric view of an anti-slip pad of the chassis.

FIG. 1 and FIG. 2 show an embodiment of a chassis 100 including an anti-slip pad 10 and a housing 20. The anti-slip pad 10 is mounted on a bottom of the housing 20 to prevent slippage. The anti-slip pad 10 includes a support member 11 and an insert member 12. The support member 11 supports the housing 20, and the insert member 12 connects the support member 11 to the housing 20. The insert member 12 is fixedly mounted on the support member 11. The housing 20 includes a mounting groove 21 through which the insert member 12 is inserted to fix the support member 11 to the housing 20.

Figure 3:
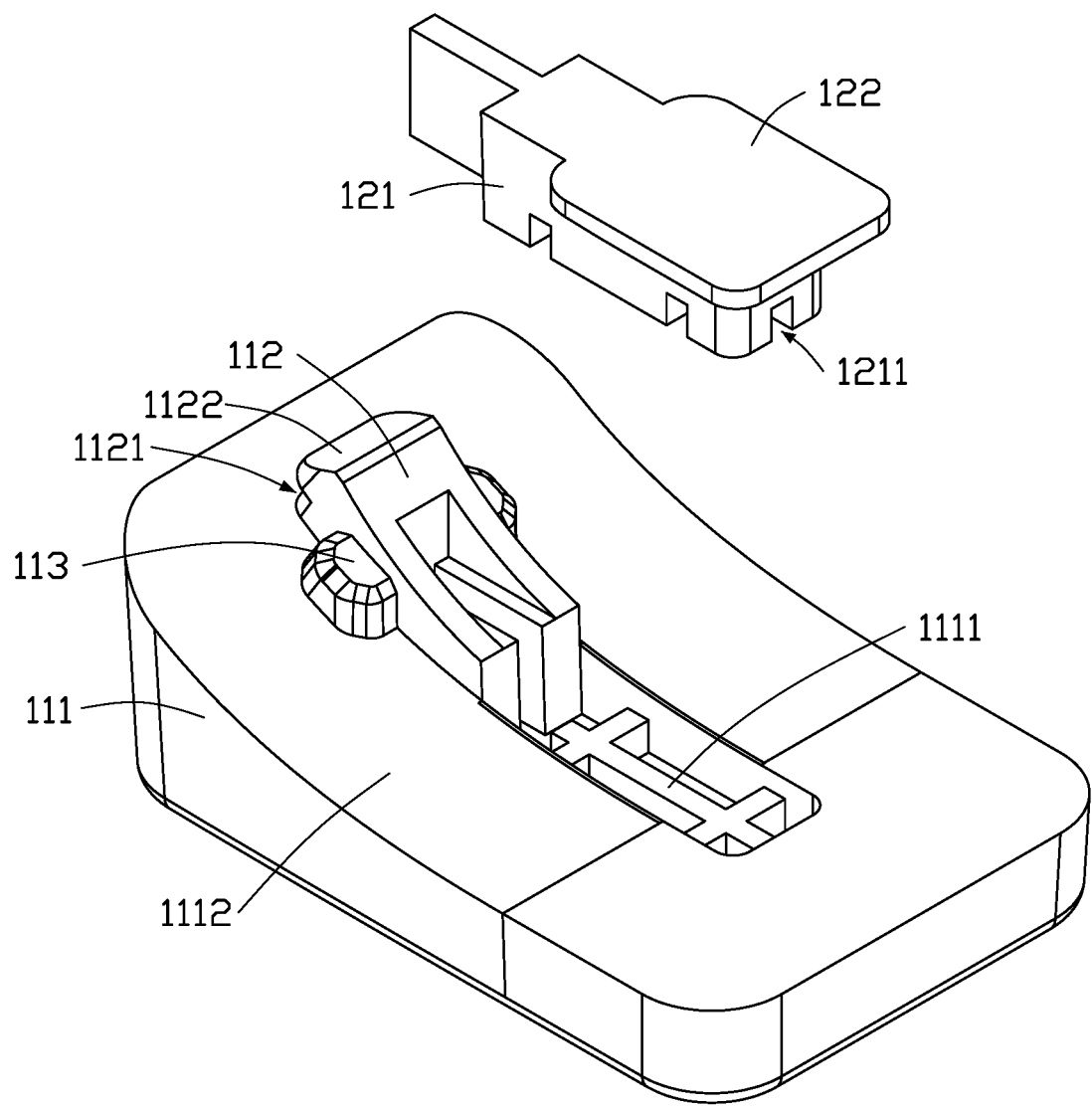
FIG. 3 is an exploded view of the anti-slip pad in FIG. 2.
Figure 4:
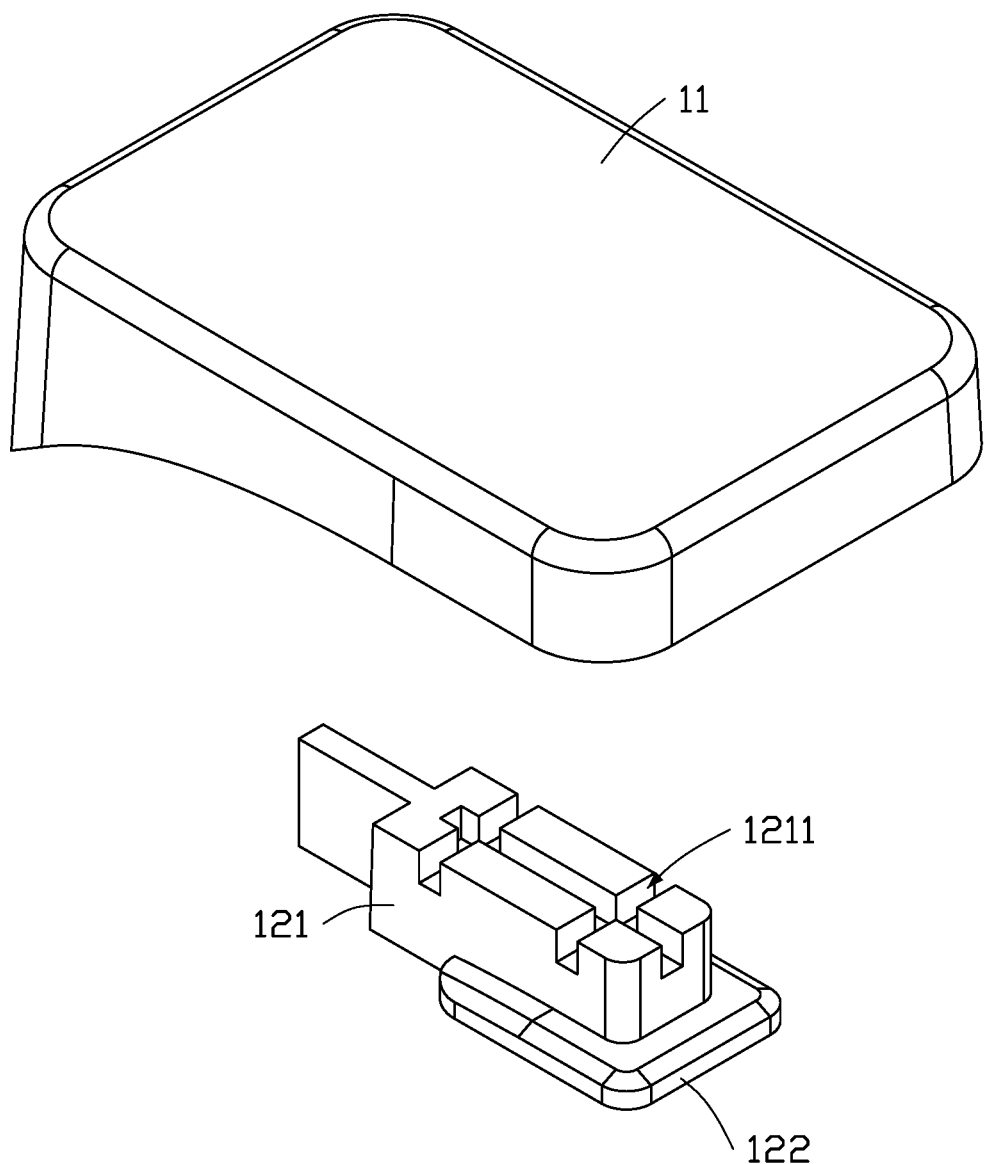
FIG. 4 is similar to FIG. 3, but showing the anti-slip pad from another angle.

Referring to FIG. 3 and FIG. 4, the support member 11 includes a support body 111, and the insert member 12 includes an insert body 121. The support body 111 includes a reinforcement rib 1111, and the insert body 121 includes a bonding groove 1211. The reinforcement rib 1111 corresponds to the bonding groove 1211, and the reinforcement rib 1111 is inserted into the bonding groove 1211 to fix the insert member 12 to the support member 11.

The support member 11 and the insert member 12 are integrally formed by a two-shot injection molding process. The support member 11 is made of a soft PC material, and the insert member 12 is made of a hard TPE material. A hardness of the insert member 12 is greater than a hardness of the support member 11. The bonding groove 1211 and the reinforcement rib 1111 serve to increase adhesion between the insert member 12 and the support member 11. In the injection molding process, the insert member 12 is first injection-molded, and the material of the support member 11 is injected into the mold containing the insert member 12. After injection molding, the support member 11 forms a corresponding reinforcement rib 1111 in the bonding groove 1211. Thus, the insert member 12 is fastened to the support member 11 by the reinforcement rib 1111 and the bonding groove 1211.

The support member 11 further includes an insertion block 112 that is fixed to the support body 111. The insertion block 112 is inserted into the interior of the housing 20, and the support body 111 is mounted outside the housing 20. A first slot 1121 is defined at an interface between the insertion block 112 and the support body 111.

The support body 111 includes a contoured surface 1112 matching an outer surface of the housing 20 for mounting the support body 111 to the housing 20.

Figure 5:
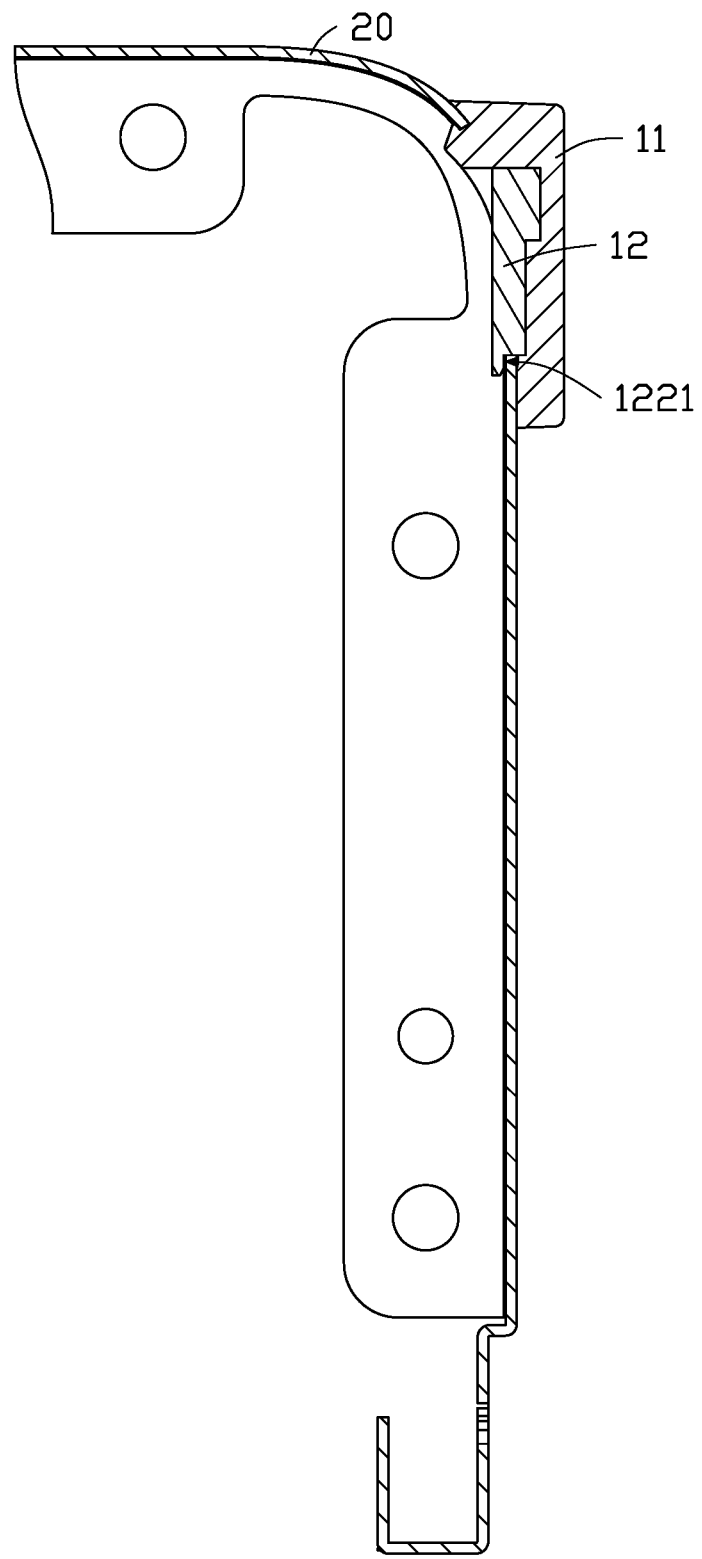
FIG. 5 is a cross-sectional view of the chassis.

Referring to FIGS. 3-5, the insert member 12 further includes an insertion plate 122 that is secured to the inner body 121. An edge of the insertion plate 122 extends a certain distance from an edge of the insert body 121, and the insertion plate 122 and the contoured surface 1112 cooperatively form a second slot 1221. The insertion plate 122 is inserted into the mounting groove 21, and an edge of the housing 20 is latched in the second slot 1221 to fix the support member 11.

Referring to FIG. 1, the mounting groove 21 includes a latching portion 211 and a mounting portion 212. The latching portion 211 communicates with the mounting portion 212. A width of the mounting portion 212 is greater than a width of the latching portion 211. The latching portion 211 is for receiving the insertion plate 122, and the mounting portion 212 is for receiving the insertion block 112.

An end of the mounting portion 212 includes a limiting slot 2121. The insertion block 112 includes a chamfer 1122. The limiting slot 2121 is used for limiting the insertion block 112. The chamfer 1122 is used for guiding the insertion block 112 into the limiting slot 2121.

Referring to FIG. 2 and FIG. 3, the support member 11 further includes a filling block 113 fixed on opposite sides of the insertion block 112 for filling a gap between the insertion block 112 and the mounting portion 212 to limit the insertion block 112.

For installing the anti-slip pad 10, the insertion plate 122 is first inserted into the mounting portion 212, and the insert main body 121 is inserted into the latching portion 211 until an edge of the housing 20 is latched in the second slot 1221 to fix one end of the anti-slip pad 10 to the housing 20. At this time, a position of the insertion block 112 corresponds to a position of the mounting portion 212. After pressure is applied to the support body 111, the chamfer 1122 guides the insertion block 112 to slide into the limiting slot 2121, and the housing 20 is latched in the first slot 1121 to fix the other end of the anti-slip pad 10. At the same time, the filling block 113 is filled in the mounting portion 212 to fix a position of the support member 11. After the support member 11 is fixed to the housing 20, the contoured surface 1112 is attached to the outer surface of the casing 20 to achieve a dustproof and flush effect. To remove the anti-slip pad 10, pressure is applied on the insertion block 112 from inside the outside toward outside the housing 20, the housing 20 is disengaged from the first slot 1121, the insertion plate 122 is removed from the latching portion 211, and the housing 20 is disengaged from the second slot 1221.

Compared with the related art, the anti-slip pad 10 utilizes the support member 11 having a lower hardness than the insert member 12, thereby increasing stability of being mounted to the housing 20 and ensuring an anti-slip effect.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A chassis comprising:
a housing; and
at least one anti-slip pad mounted on the housing; wherein:
the housing comprises a mounting groove;
the at least one anti-slip pad comprises a support member and an insert member coupled to the support member;
the support member supports the housing;
the insert member is latched in the mounting groove; and
a hardness of the insert member is greater than a hardness of the support member;
the support member comprises a support body;
the insert member comprises an insert body;
the support body comprises a reinforcement rib;
the insert member comprises a bonding groove;
the reinforcement rib is configured to be inserted into the bonding groove to fix the insert member to the support member;
the support member and the insert member are integrally formed by a two-shot injection molding process;
the support body comprises a contoured surface matching an outer surface of the housing for abutting the outer surface of the housing;
the support member further comprises an insertion block protruding from a side of the support body;
the insertion block defines a first slot adjacent to the support body; and
the first slot is configured to receive a wall of the mounting groove.

2. The chassis of claim 1, wherein:
the insert member further comprises an insertion plate fixed to the insert body;
an edge of the insertion plate extends a certain distance from an edge of the insert body;
the insertion plate and the contoured surface cooperatively form a second slot for receiving another wall of the mounting groove; and
the first slot and the second slot are respectively located at two ends of the anti-slip pad.

3. The chassis of claim 2, wherein:
the mounting groove comprises a latching portion and a mounting portion communicating with the latching portion;
a width of the mounting portion is greater than a width of the latching portion; and
the insertion plate is latched in the latching portion through the mounting portion.

4. The chassis of claim 3, wherein:
an end of the mounting portion comprises a limiting slot;
the insertion block comprises a chamfer;
the chamfer is configured to guides the insertion block to slide into the limiting slot.

5. The chassis of claim 1, wherein:
the support member further comprises a filling block;
the filling block is fixed on opposite sides of the insertion block and fills a gap between the insertion block and the mounting portion.

6. An anti-slip pad comprising:
a support member configured to support a housing; and
an insert member coupled to the support member and configured to latch in a mounting groove of the housing; wherein:
a hardness of the insert member is greater than a hardness of the support member;
the support member comprises a support body;
the insert member comprises an insert body;
the support body comprises a reinforcement rib;
the insert member comprises a bonding groove;
the reinforcement rib is configured to insert into the bonding groove to fix the insert member to the support member;
the support member and the insert member are integrally formed by a two-shot injection molding process;
the support body comprises a contoured surface matching an outer surface of the housing for abutting the outer surface of the housing;
the support member further comprises an insertion block protruding from a side of the support body;
the insertion block defines a first slot adjacent to the support body; and
the first slot is configured to receive a wall of the mounting groove;
the insert member further comprises an insertion plate fixed to the insert body;
an edge of the insertion plate extends a certain distance from an edge of the insert body;
the insertion plate and the contoured surface cooperatively form a second slot for receiving a wall of the mounting groove; and
the first slot and the second slot are respectively located at two ends of the anti-slip pad.

* * * * *